(12) United States Patent
Morita et al.

(10) Patent No.: US 7,586,212 B2
(45) Date of Patent: Sep. 8, 2009

(54) MULTI-OUTPUT POWER SUPPLY APPARATUS

(75) Inventors: Junichi Morita, Osaka (JP); Takuya Ishii, Osaka (JP); Mikio Motomori, Osaka (JP)

(73) Assignee: Panasonic Corporation, Osaka (JP)

( * ) Notice: Subject to any disclaimer, the term of this patent is extended or adjusted under 35 U.S.C. 154(b) by 189 days.

(21) Appl. No.: 11/902,880

(22) Filed: Sep. 26, 2007

(65) Prior Publication Data

US 2008/0179950 A1   Jul. 31, 2008

(30) Foreign Application Priority Data

Sep. 28, 2006   (JP) .............................. 2006-264025

(51) Int. Cl.
*H04B 15/00*   (2006.01)
*G05F 1/577*   (2006.01)
*H03L 5/00*   (2006.01)
(52) U.S. Cl. ...................... 307/82; 323/267; 327/333
(58) Field of Classification Search .................. 307/24, 307/82; 323/267; 327/333
See application file for complete search history.

(56) References Cited

U.S. PATENT DOCUMENTS 4,189,670 A * 2/1980 Tanahashi ................... 323/267

4,644,251 A * 2/1987 Rathke ......................... 323/267
2008/0079315 A1* 4/2008 Motomori et al. ............. 307/43

FOREIGN PATENT DOCUMENTS

| JP | 07-222439 | 8/1995 |
|---|---|---|
| JP | 2005-117886 | 4/2005 |
| JP | 2006-14910 | 1/2006 |
| JP | 2006-34088 | 2/2006 |

* cited by examiner

*Primary Examiner*—Albert W Paladini
*Assistant Examiner*—Michael Rutland Wallis
(74) *Attorney, Agent, or Firm*—Steptoe & Johnson LLP

(57) ABSTRACT

The present invention provides an efficient multi-output power supply apparatus that enables a reduction in the on voltage of a main switch in a step-down power supply circuit or the like over a wide input range from a low input to a high input. The power supply apparatus includes a first power supply circuit that increases an input voltage from an input power source to output a first output voltage Vo1, and a second power supply circuit that outputs a second output voltage Vo2 obtained from the input voltage via a main switch circuit connected to the input power source. The main switch circuit having a first switch element that is a PMOS transistor and a second switch element that is an NMOS transistor connected to each other in parallel. The first output voltage Vo1 is applied to a gate of the second switch element.

5 Claims, 5 Drawing Sheets

MULTI-OUTPUT POWER SUPPLY APPARATUS

FIELD OF THE INVENTION

The present invention relates to a multi-output power supply apparatus including a step-up power supply circuit and one of a step-down power supply circuit and an inversion power supply circuit.

BACKGROUND OF THE INVENTION

Electronic equipment recently used as portable equipment uses batteries as power source and has a multi-output power supply apparatus made of a plurality of power supply circuits in order to convert the voltage of the battery into desired power supply voltages for the various electronic circuits in the equipment. The battery voltage tends to be used down to a lower level in order to allow the equipment to operate longer. For example, input specifications for two size AA batteries are such that an initial input voltage is 3.4 V and a lower limit input voltage is 1.5 to 1.8 V. On the other hand, various power supply voltages are demanded. For example, for digital still cameras, 5 V is required for lens driving, and 1.2 V is required for a DSP (Digital Signal Processor). In the power supply apparatus, a step-up power supply circuit is required to generate 5 V, and a step-down power supply circuit is required to generate 1.2 V.

FIG. 5 shows the circuit configuration of a multi-output power supply apparatus made of a conventional step-up power supply circuit and a conventional step-down power supply circuit. As shown in FIG. 5, a step-up power supply circuit 10 is composed of an inductor 11 connected to an input power source 1 supplying an input voltage Vi, a main switch 12 made of an NMOS transistor connected to the other end of the inductor 11, and a diode 13 and an output capacitor 14 which rectify and smooth the voltage of the main switch 12.

The main switch 12 performs a switching operation to repeat accumulating and emitting energy in and from the inductor 11. Turning off the main switch 12 allows current to flow from the inductor 11 via the diode 13 to charge the output capacitor 14. The rate of on time in one switching period of the main switch 12 is defined as a duty ratio $\delta 1$, and a forward voltage drop in the diode 13 and the like are neglected. Then, a first output voltage Vo1 from the step-up power supply circuit 10 is expressed by:

$$Vo1=Vi/(1-\delta 1).$$

In FIG. 5, a step-down power supply circuit 60 is composed of a main switch 61 made of a PMOS transistor connected to the input power source 1 supplying the input voltage Vi, a diode 22 connected to the other end of the main switch 61, and an inductor 23 and an output capacitor 24 which smooth the voltage of the connection between the main switch 61 and the diode 22.

The main switch 61 performs a switching operation to repeat accumulating and emitting energy in and from the inductor 23. This allows current to flow via the inductor 23 to charge the output capacitor 24. The rate of on time in one switching period of the main switch 61 is defined as a duty ratio $\delta 2$, and a forward voltage drop in the diode 22 and the like are neglected. Then, a second output voltage Vo2 from the step-down power supply circuit 60 is expressed by:

$$Vo2=Vi\times\delta 2.$$

In general, a PMOS transistor has worse properties than an NMOS transistor, for example, the PMOS transistor has a higher on voltage than the NMOS transistor, provided that both transistors have the same shape. Thus, when the input voltage Vi is low, for example, 1.5 to 1.8 V as described above, the main switch 61 in the step-down power supply circuit 60 has an increased on voltage, resulting in insufficient output supply. Thus, the main switch 61 of the step-down power supply circuit 60 may be composed of an NMOS transistor.

FIG. 6 is a diagram showing the circuit configuration of a step-down power supply circuit disclosed in Japanese Patent Laid-Open No. 7-222439. As shown in FIG. 6, a step-down power supply circuit 70 is composed of a main switch 71 made of an NMOS transistor connected to the input power source 1 supplying the input voltage Vi, the diode 22, the inductor 23, and the output capacitor 24, as well as a step-up inductor 72, a step-up switch 73 made of an NMOS transistor, the step-up inductor 72 and the step-up switch 73 being connected in series so as to connect the step-up switch 73 in parallel with the input power source 1, a diode 74 that rectifies the voltage of the connection between the step-up inductor 72 and the step-up switch 73, a gate power supply capacitor 75 connected between a cathode of the diode 74 and a cathode of the diode 22, a diode 76 connected between the input power supply 1 and the gate power supply capacitor 75, and a control section 77 that turns on and off the main switch 71 and the step-up switch 73.

When the input voltage Vi is lower than a predetermined value or the main switch 71 is on at a duty ratio of 100%, the control section 77 switches the step-up switch 73. Thus, while the step-up switch 73 is off, the step-up inductor 72 can charge the gate power supply capacitor 75 via the diode 74, providing a gate power supply that can turn on the main switch 71. The step-up inductor 72, the step-up switch 73, and the diode 74 constitute a step-up converter that provides a gate power supply.

When the input voltage Vi is greater than the predetermined value and the main switch 71 has been switched, the control section 77 stops driving the step-up switch 73. Thus, turning off the main switch 71 makes the diode 76 conductive. The gate power supply capacitor 75 is then charged with the input voltage Vi via the diode 76, providing a gate power supply that can turn on the main switch 71. This configuration of the diode 76 and the gate power supply capacitor 75 is called a boot strap circuit. As described above, the step-up converter or the boot strap circuit provides the gate power supply voltage for the high voltage power supply circuit 70, which uses the NMOS transistor for the main switch 71.

As described above, in the conventional multi-output power supply apparatus, made simply of the step-up power supply circuit and the step-down power supply circuit, when the PMOS transistor is used for the main switch in the step-down power supply circuit, a low input voltage increases the on voltage of the main switch in the step-down power supply circuit. This may disadvantageously result in insufficient output supply. To prevent this, the conventional method uses the NMOS transistor for the main switch in the step-down power supply circuit and uses the step-up converter or boot strap to generate the gate power supply used to drive the NMOS transistor as shown in FIG. 6. However, the gate power supply generated by the boot strap circuit is an input voltage. Consequently, double the input voltage is applied to a gate of the main switch in the step-down power supply circuit. Thus, disadvantageously, the breakdown voltage may be exceeded when the input voltage is high.

DISCLOSURE OF THE INVENTION

The present invention is intended to solve the problems with the conventional art. An object of the present invention is to provide an efficient multi-output power supply apparatus that enables a reduction in the on voltage of the main switch in the step-down power supply circuit or the like over a wide input range from a low input to a high input.

To accomplish the object, the present invention provides a multi-output power supply apparatus including a first power supply circuit that increases an input voltage supplied by an input power source to output a first output voltage, and a second power supply circuit that outputs a second output voltage obtained from the input voltage via a main switch circuit connected to the input power source, the main switch circuit in the second power supply circuit having a parallel configuration including a first switch element that is turned on by pulling a potential of a control terminal to a lower level and a second switch element that is turned on by pulling a potential of a control terminal to a higher level, wherein a source of a voltage applied to the control terminal of the second switch element is the first output voltage from the first power supply circuit. This configuration allows the first switch element to reduce an on voltage when the input voltage is high, while allowing the second switch element to reduce an on voltage when the input voltage is low, thus enabling the second power supply circuit to operate efficiently over an entire input voltage range.

Furthermore, the second power supply circuit is a step-down converter that reduces the input voltage to output the second output voltage, or the second power supply circuit is an inversion converter that inverts the input voltage to output the second output voltage.

Furthermore, the first and second switch elements included in the parallel configuration of the main switch circuit are a PMOS transistor and an NMOS transistor, respectively, and transistor sizes of the first and second switch elements are set so that an on resistance of the first switch element offered at a maximum input voltage is substantially equal to an on resistance of the second switch element offered at a minimum input voltage. This configuration makes it possible to inhibit a variation in the parallel on resistances of the first and second switch elements depending on the input voltage.

The multi-output power supply apparatus in accordance with the present invention includes a step-up power supply circuit and has thus an advantage that the apparatus makes it possible to construct a step-down power supply circuit and an inversion power supply circuit which operate efficiently over a wide input voltage range. The multi-output power supply apparatus in accordance with the present invention is therefore useful as a multi-output power supply.

DESCRIPTION OF THE EMBODIMENTS

Embodiments of the present invention will be described below in detail with reference to the drawings.

Embodiment 1

Figure 1:
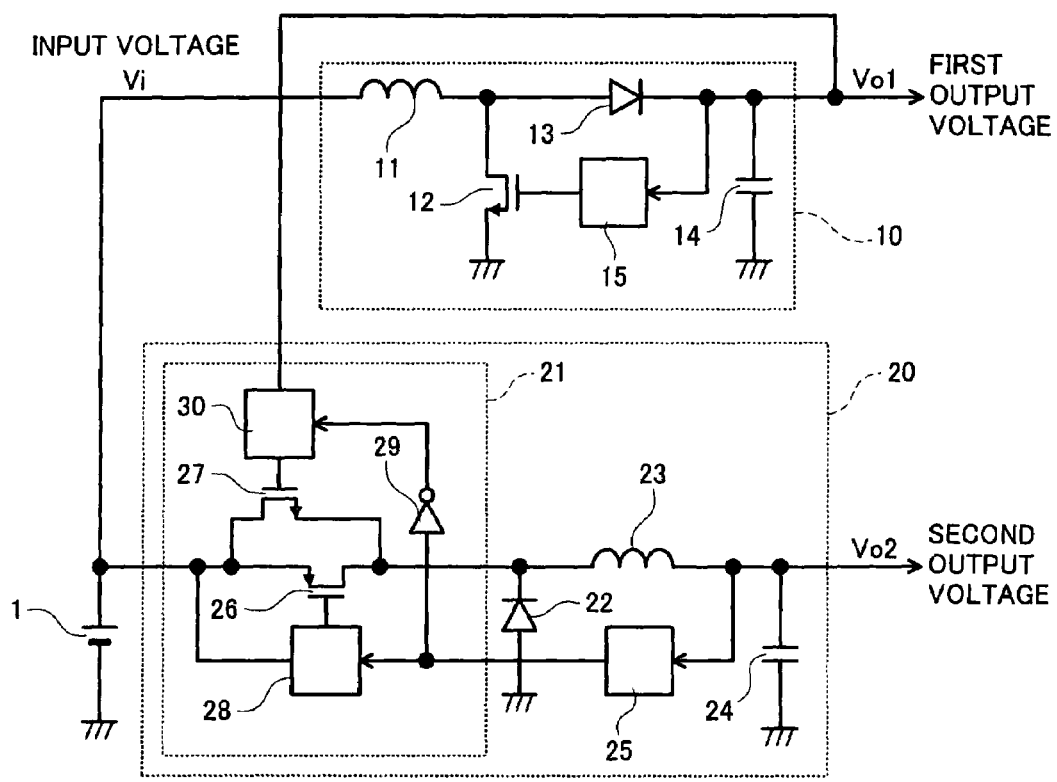
FIG. 1 is a circuit configuration diagram showing a multi-output power supply apparatus in accordance with Embodiment 1 of the present invention.
Figure 5:
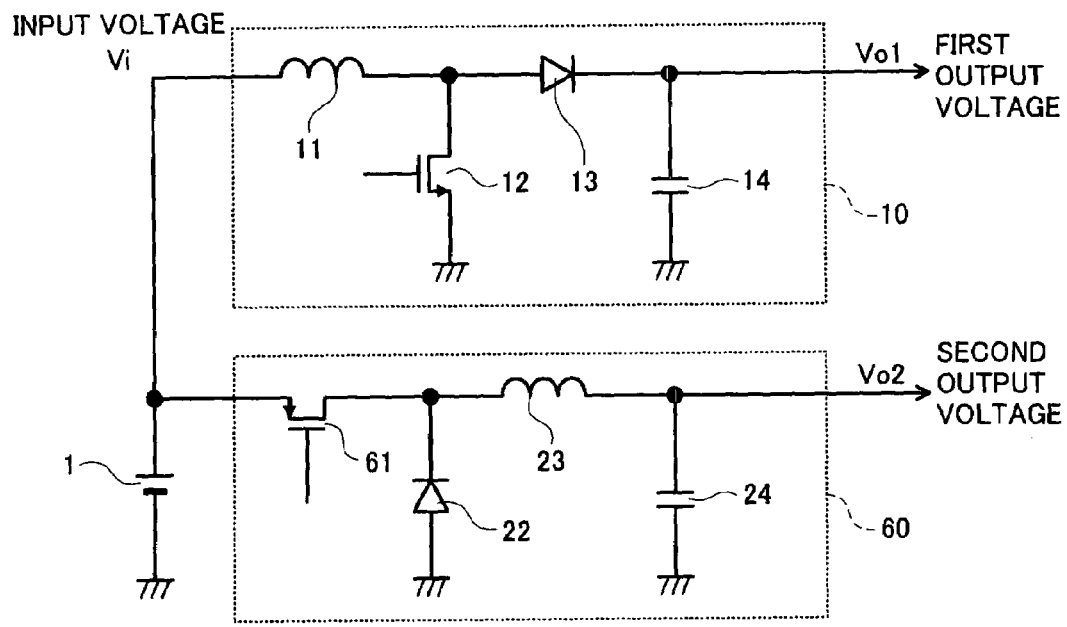
FIG. 5 is a circuit configuration diagram showing a multi-output power supply apparatus made of a conventional step-up power supply circuit and a conventional step-down power supply circuit.
Figure 6:
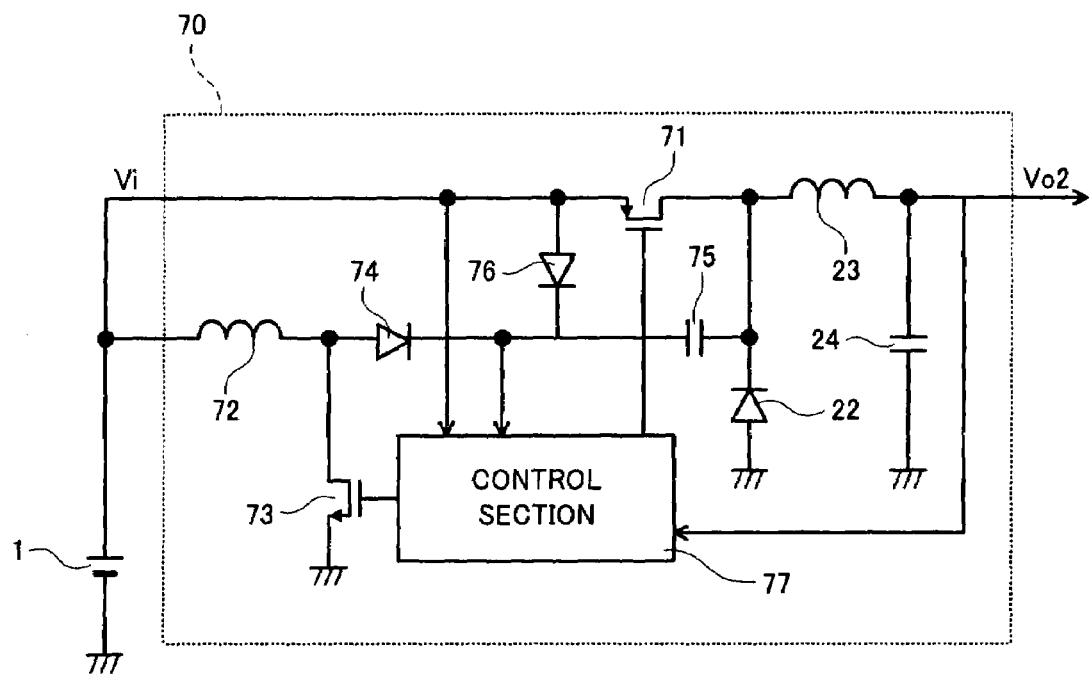
FIG. 6 is a circuit configuration diagram showing a conventional step-down power supply circuit.

FIG. 1 is a circuit configuration diagram showing a multi-output power supply apparatus in accordance with Embodiment 1 of the present invention. Here, the same reference numerals as those in FIG. 5 showing the conventional example are used to denote components of Embodiment 1 which correspond to those described with reference to FIG. 5 and which provide functions equivalent to those described with reference to FIG. 5.

As shown in FIG. 1, reference numeral 1 denotes an input power source such as a battery which provides an input voltage Vi. Reference numeral 10 denotes a step-up power supply circuit which is a first power supply circuit and which increases the input voltage Vi to output a first output voltage Vo1. The step-up power supply circuit 10 is composed of an inductor 11 connected to the input power source 1, which provides the input voltage Vi, a main switch 12 made of an NMOS transistor and connected to the other end of the inductor 11, a diode 13 and an output capacitor 14 which rectify and smooth the voltage of the main switch 12, and a first control circuit 15 that controllably turns on and off the main switch 12 so as to control the first output voltage Vo1 to a target value.

The main switch 12 performs a switching operation to repeat accumulating and emitting energy in and from the inductor 11. Turning off the main switch 12 allows current to flow from the inductor 11 via the diode 13 to charge the output capacitor 14. The rate of on time in one switching period of the main switch 12 is defined as a duty ratio δ1, and a forward voltage drop in the diode 13 and the like are neglected. Then, the output voltage Vo1 from the step-up power supply circuit 10 is expressed by:

$$Vo1=Vi/(1-\delta 1).$$

The first control circuit 15 adjusts the duty ratio δ1 so as to control the first output voltage Vo1 to the target value.

In FIG. 1, reference numeral 20 denotes a step-down power supply circuit which is a second power supply circuit and which reduces the input voltage Vi to output a second output voltage Vo2. The step-down power supply circuit 20 is composed of a main switch circuit 21 having an input terminal connected to the input power source 1, a diode 22 connected to an output terminal of the main switch circuit 21, an inductor 23 and an output capacitor 24 which smooth the voltage of the connection between the output terminal of the main switch circuit 21 and the diode 22, and a second control circuit 25 that controllably turns on and off the main switch circuit 21 so as to control the second output voltage Vo2 to a target value.

The main switch circuit 21 has a parallel configuration including a first switch element 26 that is a PMOS transistor and a second switch element 27 that is an NMOS transistor and is composed of a first driving circuit 28 that turns on and off the first switch element 26 in accordance with a driving signal output by the second control circuit 25, and a second driving circuit 30 that turns on and off the second switch element 27 in accordance with an inversion signal of the driving signal transmitted via an inverter 29. The first driving circuit 28 uses the input voltage Vi as a power supply, and the driving circuit 30 uses the first output voltage Vo1 as a power supply. That is, the first output voltage Vo1 is used as a gate power supply for the second switch element 27.

Figure 2:
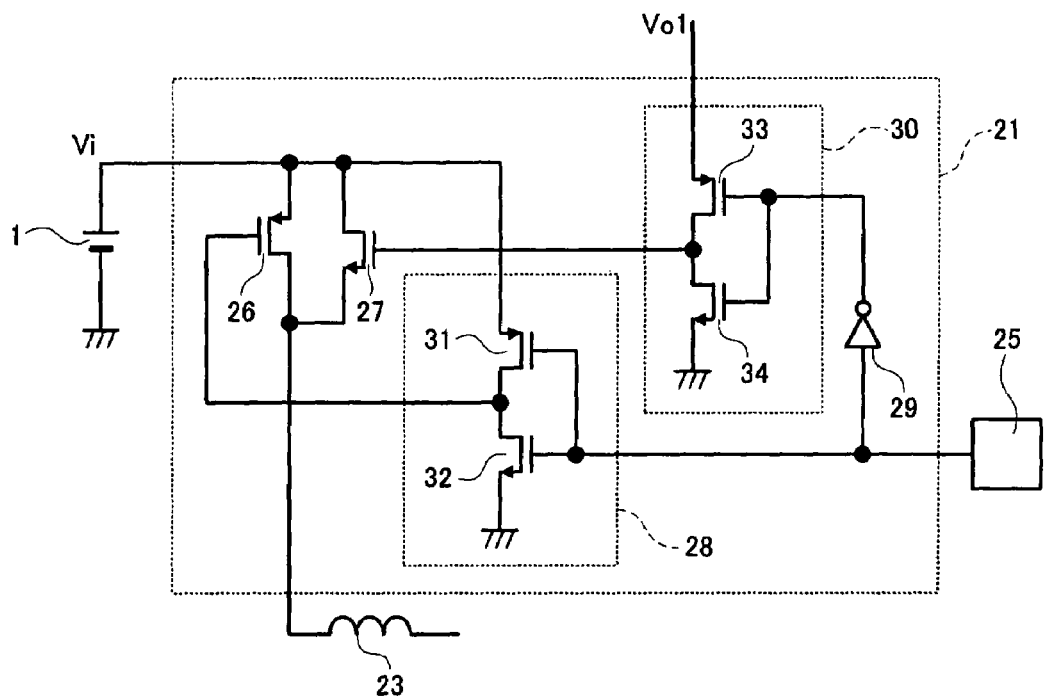
FIG. 2 is a circuit configuration diagram showing a main switch circuit in Embodiment 1.

FIG. 2 is a circuit configuration diagram of the main switch circuit 21 showing the configuration of the first driving circuit 28 and the second driving circuit 30. For the first driving circuit 28, when an output from the second control circuit 25 is at an "H" level, a PMOS transistor 31 is turned off and an NMOS transistor 32 is turned on to turn on the first switch element 26. When an output from the second control circuit 25 is at an "L" level, the PMOS transistor 31 is turned on and the NMOS transistor 32 is turned off to turn off the first switch element 26.

When an output from the second control circuit 25 is at the "H" level, the "L" level is input to the second driving circuit 30 via the inverter 29 to turn on a PMOS transistor 33, while turning off a NMOS transistor 34, thus turning on the second switch element 27. When the output from the second control circuit 25 is at the "L" level, the "H" level is input to the second driving circuit 30 via the inverter 29 to turn off the PMOS transistor 33, while turning on the NMOS transistor 34, thus turning off the second switch element 27.

A description will be given below of the operation of the second power supply circuit (step-down power supply circuit 20) in the multi-output power supply apparatus configured as described above in accordance with Embodiment 1.

The basic operation of the step-down power supply circuit 20, the second power supply circuit, is as described for the conventional example. That is, a switching operation of opening and closing the input terminal and output terminal of the main switch circuit 21 causes energy to be repeatedly accumulated in and emitted from the inductor 23. Current charging the output capacitor 24 flows via the inductor 23 while the main switch circuit 21 is off. The rate of on time in one switching period of the main switch circuit 21 is defined as a duty ratio δ2, and a forward voltage drop in the diode 22 and the like are neglected. Then, the second output voltage Vo2 from the step-down power supply circuit 20 is expressed by:

$$Vo2 = Vi \times \delta2.$$

First, when the input voltage Vi is low, the corresponding insufficient gate voltage increases the on resistance of the first switch element 26, the PMOS transistor. However, while the second switch element 27, the NMOS transistor, is on, the second switch element 27 is supplied with a gate voltage from the first output voltage Vo1. The differential voltage (Vo1-Vi) between the first output voltage Vo1 and the input voltage Vi is applied as a gate-source voltage. Thus, a decrease in input voltage Vi increases the gate-source voltage to reduce the on resistance. This allows the main switch circuit 21 to perform the switching operation at a low on voltage.

Then, when the input voltage Vi is high, the second switch element 27, the NMOS transistor, provides a reduced gate-source voltage (Vo1-Vi) and thus an increased on resistance. However, the on resistance of the first switch element 26, the PMOS transistor, is reduced by the application of the input voltage Vi as the source-gate voltage. This allows the main switch circuit 21 to perform the switching operation at a low on voltage.

As described above, in the step-down power supply circuit 20, the second power supply circuit in the multi-output power supply apparatus in accordance with Embodiment 1, the main switch circuit 21 can perform the switching operation at a low on voltage regardless of the level of the input voltage Vi. Further, the gate power supply voltage for the second switch element 27, constituting the main switch circuit 21, is the first output voltage Vo1 controllably stabilized by the step-up power supply circuit 10, the first power supply circuit. This prevents the breakdown voltage from being exceeded.

Figure 3:
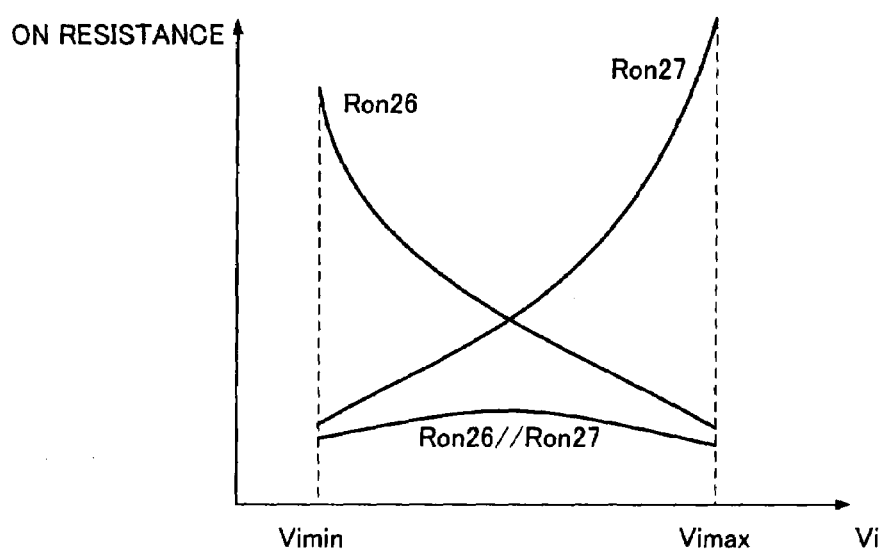
FIG. 3 is a diagram showing how on resistances of a first switch element and a second switch element in Embodiment 1 and a parallel resistance of the on resistances vary depending on an input voltage Vi.

FIG. 3 shows a variation in the on resistance Ron 26 of the first switch element 26, the on resistance Ron 27 of the second switch element 27, and the parallel resistance (Ron26// Ron27) of the on resistance Ron 26 and the on resistance Ron 27 in accordance with the input voltage Vi. Since the source-gate voltage is the input voltage Vi, the on resistance of the first switch element 26, the PMOS transistor, increases with decreasing input voltage Vi. On the other hand, since the gate-source voltage is the differential voltage (Vo1-Vi) between the first output voltage Vo1 and the input voltage Vi, the on resistance of the second switch element 27, the NMOS transistor, increases consistently with the input voltage Vi. The parallel resistance of the on resistances Ron26 and Ron27 corresponds to the on resistance of the main switch circuit 21. To obtain a stable resistance value of the on resistance of the main switch circuit 21 with less fluctuation caused by the input voltage Vi, the transistor size of each switch may be set so that the on resistance Ron27 of the second switch element 27 offered at the minimum input voltage Vi is substantially equal to the on resistance Ron26 of the first switch element 26 offered at the maximum input voltage Vi.

Embodiment 2

Figure 4:
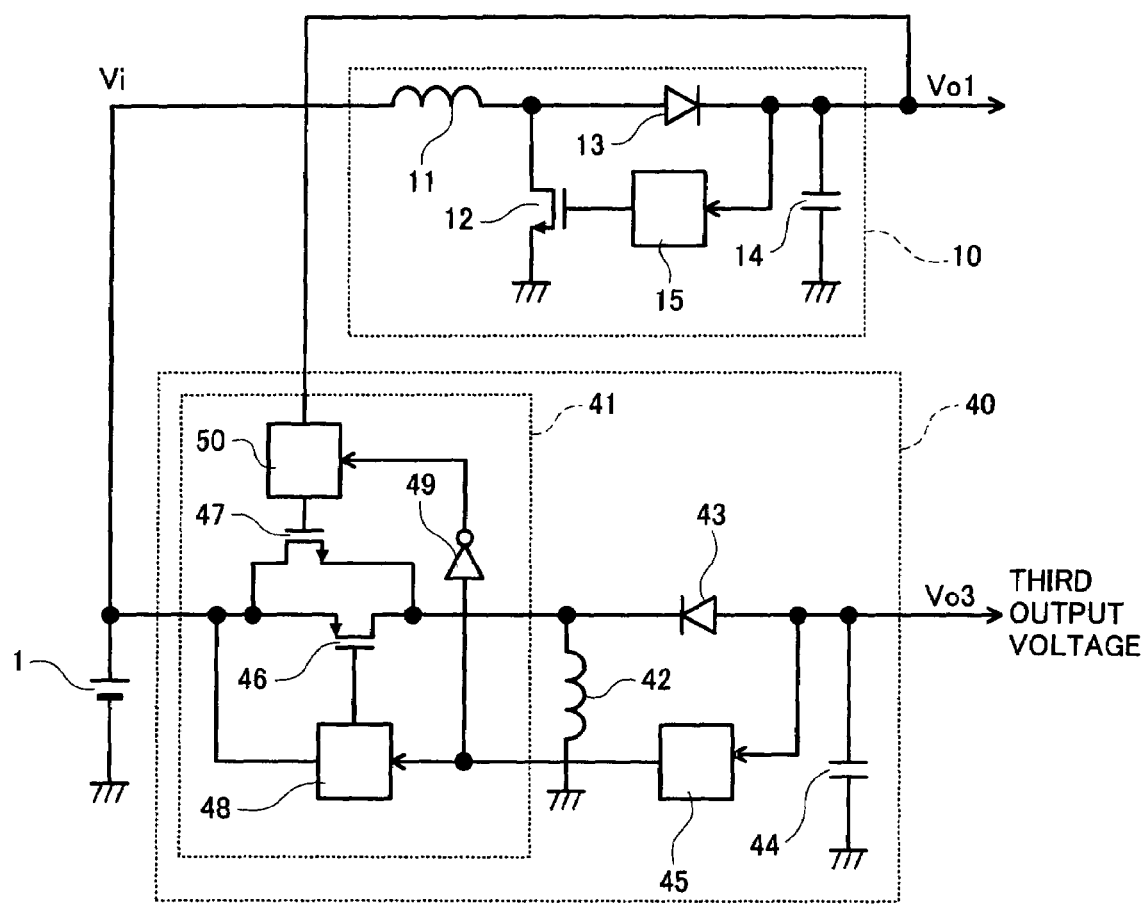
FIG. 4 is a circuit configuration diagram showing a multi-output power supply apparatus in accordance with Embodiment 2 of the present invention.

FIG. 4 is a circuit configuration diagram of a multi-output power supply apparatus in accordance with Embodiment 2 of the present invention. In Embodiment 2, the second power supply circuit configured as the step-down power supply circuit 20 in accordance with Embodiment 1, described above, is constructed using a third power supply circuit (inversion power supply circuit 40). As shown in FIG. 4, the inversion power supply circuit 40, the third power supply circuit, inverts and increases or reduces the input voltage Vi to output a third output voltage Vo3.

The inversion power supply circuit 40 is composed of a main switch circuit 41 having an input terminal connected to the input power source 1, an inductor 42 connected to an output terminal of the main switch circuit 41, a diode 43 having a cathode connected to the connection point between the output terminal of the main switch circuit 41 and the inductor 42, an output capacitor 44 connected to an anode of the diode 43 for smoothing, and a third control circuit 45 that controllably turns on and off the main switch circuit 41 so as to control the third output voltage Vo3 to a target value.

The main switch circuit 41 has a parallel configuration including a first switch element 46 that is a PMOS transistor and a second switch element 47 that is an NMOS transistor and is composed of a first driving circuit 48 that turns on and off the first switch element 46 in accordance with a driving signal output by the third control circuit 45, and a second driving circuit 50 that turns on and off the second switch element 47 in accordance with an inversion signal of the driving signal transmitted via an inverter 49. The first driving circuit 48 uses the input voltage Vi as a power supply, and the second driving circuit 50 uses the first output voltage Vo1 as a power supply. That is, the first output voltage Vo1 is used as a gate power supply for the second switch element 47.

A switching operation of opening and closing the input terminal and output terminal of the main switch circuit 41 causes energy to be repeatedly accumulated in and emitted from the inductor 42. Current charging the output capacitor 44 flows via the inductor 42 while the main switch circuit 41 is off. The rate of on time in one switching period of the main switch circuit 41 is defined as a duty ratio δ3, and a forward voltage drop in the diode 43 and the like are neglected. Then, the third output voltage Vo3 from the inversion power supply circuit 40 is expressed by:

$$Vo3=(Vi\times\delta 3)/(1-\delta 3).$$

The main switch circuit 41 has a configuration similar to that of the main switch circuit 21 in accordance with Embodiment 1 and operates in the same manner as that in Embodiment 1. That is, a decrease in input voltage Vi increases the on resistance of the first switch element 46. However, since the differential voltage (Vo1-Vi) between the first output voltage Vo1 and the input voltage Vi is applied as the gate-source voltage, the on resistance of the second switch element 47, the NMOS transistor, decreases consistently with the input voltage Vi.

An increase in input voltage Vi increases the on resistance of the second switch element 47, while reducing the on resistance of the first switch element 46, the PMOS transistor. As a result, the main switch circuit 41 can perform the switching operation at a low on voltage regardless of the level of the input voltage Vi. Further, the gate power supply voltage for the second switch element 47, constituting the main switch circuit 41, is the first output voltage Vo1 controllably stabilized by the step-up power supply circuit 10, the first power supply circuit. This prevents the breakdown voltage from being exceeded.

What is claimed is:

1. A multi-output power supply apparatus comprising a first power supply circuit that increases an input voltage supplied by an input power source to output a first output voltage, and a second power supply circuit that outputs a second output voltage obtained from the input voltage via a main switch circuit connected to the input power source,
the main switch circuit in the second power supply circuit having a parallel configuration including a first switch element that is turned on by pulling a potential of a control terminal to a lower level and a second switch element that is turned on by pulling a potential of a control terminal to a higher level, wherein a source of a voltage applied to the control terminal of the second switch element is the first output voltage from the first power supply circuit.

2. The multi-output power supply apparatus according to claim 1, wherein the second power supply circuit is a step-down converter that reduces the input voltage to output the second output voltage.

3. The multi-output power supply apparatus according to claim 1, wherein the second power supply circuit is an inversion converter that inverts the input voltage to output the second output voltage.

4. The multi-output power supply apparatus according to claim 1, wherein the first and second switch elements included in the parallel configuration of the main switch circuit are a PMOS transistor and an NMOS transistor, respectively.

5. The multi-output power supply apparatus according to claim 4, wherein transistor sizes of the first and second switch elements are set so that an on resistance of the first switch element offered at a maximum input voltage is substantially equal to an on resistance of the second switch element offered at a minimum input voltage.

* * * * *